(12) United States Patent
Stoy

(10) Patent No.: US 6,593,451 B1
(45) Date of Patent: Jul. 15, 2003

(54) METHOD OF PROCESSING POLYACRYLONITRILE

(75) Inventor: George P. Stoy, Boro of Rocky Hill, NJ (US)

(73) Assignee: PragTech, Inc., Flemington, NJ (US)

( * ) Notice: Subject to any disclaimer, the term of this patent is extended or adjusted under 35 U.S.C. 154(b) by 0 days.

(21) Appl. No.: 10/267,893

(22) Filed: Oct. 9, 2002

(51) Int. Cl.$^7$ .................................................. C08F 6/06
(52) U.S. Cl. ...................... 528/487; 528/488; 528/491; 528/492; 528/493; 528/495; 528/496; 528/497; 528/498; 528/503; 264/331.16; 264/345
(58) Field of Search ................................. 528/487, 488, 528/492, 493, 495, 496, 499, 491, 497, 498, 502 R, 503; 264/331.16, 345

(56) References Cited

U.S. PATENT DOCUMENTS

| | | | |
|---|---|---|---|
| 2,710,846 A | * | 6/1955 | Dietrich et al. ..... 264/331.16 X |
| 4,369,294 A | | 1/1983 | Stoy |
| 4,403,055 A | * | 9/1983 | Hungerford ........ 264/331.16 X |
| 4,731,078 A | | 3/1988 | Stoy et al. |
| 4,731,079 A | | 3/1988 | Stoy |
| 4,943,618 A | | 7/1990 | Stoy et al. |
| 4,944,758 A | | 7/1990 | Bekki et al. |
| 5,092,896 A | | 3/1992 | Meuli et al. |
| 5,149,052 A | | 9/1992 | Stoy et al. |
| 5,159,360 A | | 10/1992 | Stoy et al. |
| 5,217,026 A | | 6/1993 | Stoy et al. |
| 5,218,039 A | | 6/1993 | Stoy et al. |
| 5,368,048 A | | 11/1994 | Stoy et al. |
| 5,425,777 A | | 6/1995 | Sarkisian et al. |
| 5,549,690 A | | 8/1996 | Hollister et al. |
| 5,578,086 A | | 11/1996 | Prescott |
| 5,728,157 A | | 3/1998 | Prescott |
| 6,168,626 B1 | | 1/2001 | Hyon et al. |
| 6,383,223 B1 | | 5/2002 | Baehler et al. |
| 6,386,877 B1 | | 5/2002 | Sutter |
| 2001/0025199 A1 | | 9/2001 | Rauscher |

OTHER PUBLICATIONS

Hackh's Chem. Dict. (4th ed) McGraw–Hill, N.Y., 1969, p. 125.*

* cited by examiner

Primary Examiner—Fred Teskin
(74) Attorney, Agent, or Firm—Kenneth P. Glynn, esq.

(57) ABSTRACT

The present invention involves a method of processing polyacrylonitrile into a predetermined form. The first step in this method includes preparing a solution of a room temperature solvent that will dissolve polyacrylonitrile at room temperature and, a room temperature non-solvent that will not dissolve polyacrylonitrile at room temperature. The solution is prepared with sufficient non-solvent to render the room temperature solvent inoperable such that it will not dissolve polyacrylonitrile at room temperature and such that it will be operable at temperatures above 65° C. to dissolve polyacrylonitrile therein. The second step in the present invention method involves combining polyacrylonitrile with the solution to form a mixture, in an amount of at least 20%, by weight, of polyacrylonitrile, based on the total weight of the mixture. Preferred is about 20% to about 50% by weight of the polyacrylonitrile. The third step involves processing the mixture in a hot-melt processor at temperatures in excess of 65° C. to produce a polyacrylonitrile product. An optional fourth step, which would be useful in forming medical devices and related products, involves extracting solvent from the product by liquid extraction, e.g. warm water wash.

20 Claims, 1 Drawing Sheet

METHOD OF PROCESSING POLYACRYLONITRILE

BACKGROUND OF THE INVENTION

1. Field of the Invention

The present invention relates to a method of processing polyacrylonitrile ("PAN"). More specifically, it relates to a method of processing PAN into products using significantly less solvent while creating products having superior physical characteristics. The present invention also relates to methods of processing polyacrylonitrile to produce prosthetic products and artificial joints, as well as the products themselves.

2. Information Disclosure Statement

The following patents are representative of the art relating to processing of polyacrylonitrile and products resulting therefrom:

U.S. Pat. No. 4,369,294 discloses block copolymers having acrylonitrile sequences and sequences of glutarimide units of a molecular weight of from about 10,000 to about 2,000,000 where the acrylonitrile sequences and sequences including glutarimide units are of molecular weight of at least about 400 with the number of sequences being at least about 2 and preferably 5 and higher.

U.S. Pat. No. 4,731,078 describes an artificial intraocular lens that features an optical body for refracting images onto the retina and an outer surface that encloses that optical body, is exposed to fluid within the eye, and has a refractive index no greater than 1.40. In another aspect, the optical body includes an internal refractive surface whose contour can be selectively changed to change its refractive power.

U.S. Pat. No. 4,731,079 describes a novel intraocular lens and mode of insertion therefore. The lens is of conventional shape and dimensions but is made of polymeric material having a softening point in the range of body temperature. The lens, prior to insertion is dimensionally reduced to enable introduction through a small incision by compression or by axial extension. The deformed lens is frozen in this configuration by cooling the lens below its softening temperature. The cooled, deformed lens is then inserted into the eye. The action of body heat, optionally supplemented by various non-harmful methods, permits the lens to regain its original configuration within the eye.

U.S. Pat. No. 4,943,618 describes a method that is disclosed for preparing polyacrylonitrile copolymers by heterogeneous reaction of polyacrylonitrile aquagel. Generally, the method includes the steps of preparing a solution of polyacrylonitrile by dissolving the polyacrylonitrile in a water-miscible solvent which is capable of dissolving the polyacrylonitrile but incapable of hydrolyzing the nitrile groups of the polyacrylonitrile under the dissolution conditions. Coagulating the polyacrylonitrile solution by replacing the solvent with a coagulating fluid such as water or a water miscible fluid incapable of dissolving polyacrylonitrile at temperatures below 80° C., and incapable of reacting with nitrile groups of the polyacrylonitrile, thus obtaining the polymer in the aquagel state. Replacing the coagulating fluid with a fluid reagent capable of reacting with nitrile groups of the polyacrylonitrile aquagel but incapable of dissolving the polyacrylonitrile aquagel at the selected reaction temperature. Allowing the fluid reagent to chemically react with the nitrile groups of the aquagel while the polyacrylonitrile aquagel is undissolved to form a copolymer product. The copolymer product is then either used in further chemical reactions involving newly formed and/or original side substituents, or isolated and utilized for molding or shaping into various articles. Various plasticizers, which when undiluted are capable of dissolving polyacrylonitrile, may be added to the copolymer product to assist in molding or shaping the material into an article.

U.S. Pat. No. 5,149,052 describes a method and apparatus for precision molding soluble polymers is disclosed, in order to form an exact and precisely shaped product, such as contact lenses and surgical implants. A preferred mold for forming contact lenses includes a female part having an indentation and a sharp circumferential edge surrounding the indentation. The mold also includes a male part which is adapted to contact the sharp circumferential edge of the female part to form the molding cavity between the indentation of the female part and the male part. A semi-permeable gate is formed between the female part and the male part for introducing coagulating fluid into the molding cavity while preventing the escape of the polymer solution from the molding cavity. The semi-permeable gate allows the diffusion of the coagulating fluid into the molding cavity at a faster rate than the rate of diffusion of solvent out of the molding cavity. The polymer solution is coagulated by the influx of the coagulating fluid into the polymer solution which causes both the coagulation and swelling of the polymer solution. Swelling of the polymer solution coagulates the solution under pressure within the molding cavity to form a precisely shaped product. Coagulation proceeds under pressure since the solvent diffuses out of the semi-permeable gate at a slower rate than the diffusion of the coagulating fluid into the molding cavity.

U.S. Pat. No. 5,159,360 describes a contact lens that is a soft, disposable lens which, under eye wearer conditions, changes one or more characteristics essential for comfortable use, at a predetermined time to initiate disposal thereof by the user. This lens, under wear conditions, changes, for example, at least its base curve redius and its deformability as a consequence of a change in hydrophilicity of at least a portion of the contact lens material. This hydrophilicity change may be achieved by various means, e.g. degradation of crosslinking bridges or conversion of less hydrophilic groups to groups having greater hydrophilicity. In one preferred embodiment, the conversion is achieved by hydrolysis of selected functional (hydrophobic) groups into hydrophilic groups.

U.S. Pat. No. 5,217,026 describes a guidewire that involves an elongated, non-hydrogel core element forming an inner part of the device, and an integral outside tubular layer of elastomeric hydrogel ("hydrogel sleeve"). This outer hydrogel layer has unique physical characteristics. They are (a) Gradient of chemical composition with increasing concentration of polar groups in the outward direction away from the core element; (b) Gradient of swelling in contact with water with water content increasing in the outward direction away from the core element; (c) Compressive stress in the outer hydrophilic layer causing the hydrogel in that layer to swell to a water content and, optionally, (d) Inward-directed radial stress pushing the outside hydrogel layer constantly against the inner core element. The present invention also involves the methods of making these guidewires, including melt extrusion directly onto the core element, coagulation from solution, in situ hydrogel polymer formation, and tubing extrusion followed by consequent shrink-fit over the core.

U.S. Pat. No. 5,218,039 describes stable emulsions and dispersions of both the water-in-oil and oil-in-water types that are prepared by subjecting mixtures of the two phases to shear stress in the presence of nitrile group-containing copolymers capable of forming hydrogels containing at least 90%, by weight, of water at room temperature.

U.S. Pat. No. 5,368,048 describes a method of making a radio-opaque tipped, sleeved guidewire. It includes providing a bendable core piece of a predetermined length, having a control end and having a predetermined core diameter, and providing a shrinkable polymeric sleeve formed of a first polymer composition having a first diameter at least as large as said core diameter and having a second, smaller diameter from shrinking said second diameter, which is less than said core diameter. The polymeric sleeve is placed over the core piece while the polymeric sleeve has its first diameter, so as to have one end of the polymeric sleeve cover at least a portion of the distal end of the core piece. Next, a mixture of a radio-opaque metal powder and a second polymer composition is provided. The second polymer composition is capable of forming a physical bond with the first polymeric composition of the polymeric sleeve. The mixture is inserted into the overhanging polymeric sleeve at the distal end of the core piece and the polymeric sleeve is shrunk to its second, smaller diameter. The physical bond is formed between the first polymer composition and the second polymer composition. The present invention is also directed to the resulting guidewire products.

The following patents are representative of artificial joint patents:

U.S. Pat. No. 4,944,758 describes an artificial joint comprising a first member including a butt portion located at one end of the first member and having an internal opening and a long guide groove extending to the opening and a second member in contact with the butt portion of the first member and including an expanded portion at one end of the second member. The expanded portion is fitted in the internal opening of the first member. A projection along both sides of the long guide groove prevents the expanded portion from separating from the internal opening except at prescribed positions of the first and second members, the long guide groove guides the movement of the second member as it bends relative to the first member in a prescribed direction.

U.S. Pat. No. 5,092,896 describes a finger joint prosthesis that is provided which consists of two pegs of sintered hydroxylapatite for anchoring in adjacent finger bones and which is provided with an intermediate slide layer of polyurethane between the pegs to permit relative movement therebetween. The pegs together with the intermediate layer which may be anchored on one of the pegs form concave and convex bearing areas mating with each other to allow a guided motion in the bend-stretch plane.

U.S. Pat. No. 5,425,777 describes a metallic implantable finger joint that has a biocompatible protective coating and includes both a base member and a protraction member. The base member is formed with a recess and has a protrusion projecting from inside the recess. The protraction member has a hemispherical surface which is slidingly engageable with the recess of the base member. Additionally, the protraction member is formed with a groove which engagingly receives the protrusion from the base member. This engagement is such that when the base member is juxtaposed with the protraction member, the interaction between the protrusion and the groove allows for relative movement between the members in flexion-extension, lateral rotation and pure rotation. The finger joint can also include implant barbs which are selectively engageable with the base member and the protraction member.

U.S. Pat. No. 5,549,690 describes a method for molding a prosthetic CMC thumb joint, and the joint manufactured therefrom, involves anatomically locating the two non-perpendicular and non-intersecting axes of rotation for the joint. The surface of revolution about these two axes, which is a torus, is then used to mathematically model the bearing surfaces of the prosthetic joint.

U.S. Pat. No. 5,728,157 describes a non-resorbable flexible prosthesis that includes a composite made of an elastomeric matrix and a plurality of hydroxylapatite particles dispersed throughout the matrix. The hydroxylapatite particles form about 25%–70%, by weight, of the prosthesis. The matrix is cured to form a flexible prosthesis such that an applied force can distort the flexible prosthesis from its original shape and the flexible prosthesis will substantially return to its original shape when the applied force is removed.

U.S. Pat. No. 5,578,086 describes a non-percutaneous prosthesis, reconstuctive sheeting and composite material which exhibit excellent tissue adhesion, outstanding biocompatibility, moldability, trimability and flexibility are disclosed. The non-percutaneous prosthesis, reconstructive sheeting and composite material can be easily molded into various shapes, trimmed with a scalpel and deformed during prosthesis positioning. The non-percutaneous prosthesis comprises a biocompatible composite material which is made of an elastomeric material and bio-active ceramic or glass particles and has a predetermined shape. The bio-active ceramic or glass particles are dispersed throughout a matrix of the elastomeric material having a predetermined shape, or the elastomeric material is formed to the predetermined shape and the bio-active ceramic or glass particles are coated on a surface of the elastomeric material. In another embodiment, the non-percutaneous prosthesis comprises a base material of predetermined shape and a layer of elastomeric material provided on the base material, wherein a layer of elastomeric material has distributed therein or provided thereon bio-active ceramic or glass particles. The elastomeric material is preferably one of silicone, polyurethane and its derivatives, hydrogel and C-Flex® and, more preferably, is silicone or hydrogel. The bio-active ceramic or glass particles are preferably made of hydoxylapatite. The reconstructive sheeting comprises a biocompatible composite material made of an elastomeric material and bio-active ceramic or glass particles. Also, the present invention provides a biocompatible composite material comprising hydrogel and particles of a bio-active ceramic or glass material. The particles are preferably dispersed throughout a matrix of hydrogel.

U.S. Pat. No. 6,168,626 describes an ultra high molecular weight polyethylene molded article for artificial joints that has molecular orientation or crystal orientation in the molded article, and is low in friction and is superior in abrasion resistance, and therefore is available as components, for artificial joints. Further, the ultra high molecular weight polyethylene molded article for artificial joints can be used as a component for artificial hip joints (artificial acetabular cup), a component for artificial knee joints (artificial tibial insert) and the socket for artificial elbow joints, and in addition to the medical use, it can be applied as materials for various industries by utilizing the characteristics such as low friction and superior abrasion resistance.

U.S. Pat. No. 6,383,223 describes, in an endoprosthesis for a joint, the two interacting joint parts are joined by a cord-type connection piece, which is attached in the vicinity of the body axis of the convex condyle and extends through a longitude groove in the flexion direction of the joint. The connection piece assures a play space between the contact surfaces of joint. It is protected from friction on groove wall by an elevation in concave joint part. An elevation at concave joint part and a depression at convex joint part interact in such a way that the lateral movement play space between depression and elevation determines the freedom of movement with respect to the lateroflexion of the joint. In preferred forms of embodiment, thanks to spherical surfaces at least one pair of corresponding sliding surfaces on the two condyles lie flatly on one another, under load, in any position of the joint.

U.S. Pat. No. 6,386,877 describes the implant that has an anchoring part with an axis, a general cylindrical section and a peripheral surface. The latter is provided, in the generally cylindrical section, with protuberances which are distributed around the axis. At least the majority of these protuberances are elongate and parallel with the axis and have at least one terminal surface which is contiguous with a recess having a base formed by the peripheral surface. In this way, the anchoring part can be pushed into a substantially cylindrical hole in a one such that the implant is immediately anchored in the bone in a stable manner, said implant nevertheless having a high degree of strength.

U.S. Pat. Application Publication No. 2001/0025199 describes the invention that shows an artificial finger joint comprising a convex joint head and comprising a concave joint shell which can be fastened independently of one another with a respective shaft in a bone end and which can be moved in an articulation plane from an extension position with parallel shaft axes into a hyperextension position or into an articulation end position. A guide pin projects out of the joint shell in the direction of its shaft axis and protrudes into a pocket of the joint head with the pocket having a first abutment for the guide pin in the hyperextension position. A second abutment between the joint shell and the joint head prevents a tilting of the guide pin and shaft of the joint shell about the first abutment in the hyperextension position.

Notwithstanding the prior art, the present invention is neither taught nor rendered obvious thereby.

SUMMARY OF THE INVENTION

The present invention involves a method of processing polyacrylonitrile into a predetermined form. The first step in this method includes preparing a solution of a room temperature solvent that will dissolve polyacrylonitrile at room temperature and, a room temperature non-solvent that will not dissolve polyacrylonitrile at room temperature. The solution is prepared with sufficient non-solvent to render the room temperature solvent inoperable such that it will not dissolve polyacrylonitrile at room temperature and such that it will be operable at temperatures above 65° C. to dissolve polyacrylonitrile therein. The second step in the present invention method involves combining polyacrylonitrile with the solution to form a mixture, in an amount of at least 20%, by weight, of polyacrylonitrile, based on the total weight of the mixture. Preferred is about 20% to about 50% by weight of the polyacrylonitrile. The third step involves processing the mixture in a hot-melt processor at temperatures in excess of 65° C. to produce a polyacrylonitrile product.

An optional fourth step, which would be useful in forming medical devices and related products, involves extracting solvent from the product by liquid extraction, e.g. warm water wash.

The room temperature solvent is selected from any solvent strong or weak, that will dissolve PAN at room temperature, these include dimethyl sulfoxide, dimethyl formamide, NaSCN, $Ca(CNS)_2$, nitric acid, ethylene carbonate and mixtures thereof, although others may be used. The present invention process non-solvent may be any which function to render the room temperature solvent useless as a solvent for PAN at room temperature, but will permit that solvent to function at elevated temperatures. The non-solvent may be selected from the group consisting of water, liquid carbon compounds that do not dissolve polyacrylonitrile, and combinations thereof. The carbon compounds may be selected from the group consisting of liquid straight chain hydrocarbons, liquid ring hydrocarbons, liquid ring-straight chain hydrocarbons, and mixtures thereof. The non-solvent may also be selected from the group consisting of glycol, liquid alcohols, liquid ketones, and combinations thereof. In general, the solvent solution is achieved by simply mixing the solvent and non-solvent, at room or elevated temperature, and the components should be miscible with one another.

The solution preferably contains about 40% to 98% of the room temperature solvent and about 60% to 2% of the room temperature non-solvent, by weight, based on the weight of the room temperature solvent and the room temperature non-solvent. More preferably, the solution contains at least 50%, by weight, of room temperature solvent, based on the weight of the room temperature solvent and the room temperature non-solvent.

The mixture processing step following the mixing of the solution and the polyacrylonitrile could involve cold molding or casting or the like, but is preferably and advantageously a processing step in a hot-melt processor, such as extrusion, injection molding, compression molding and hot casting.

In preferred embodiments of the present invention, the step (b) PAN is granular (i.e. powder) polyacrylonitrile, and the resulting mixture of the process is in flake form.

BRIEF DESCRIPTION OF THE DRAWINGS

The present invention should be more fully understood when the specification herein is taken in conjunction with the drawings appended hereto wherein.

DETAILED DESCRIPTION OF THE PRESENT INVENTION

Figure 1:
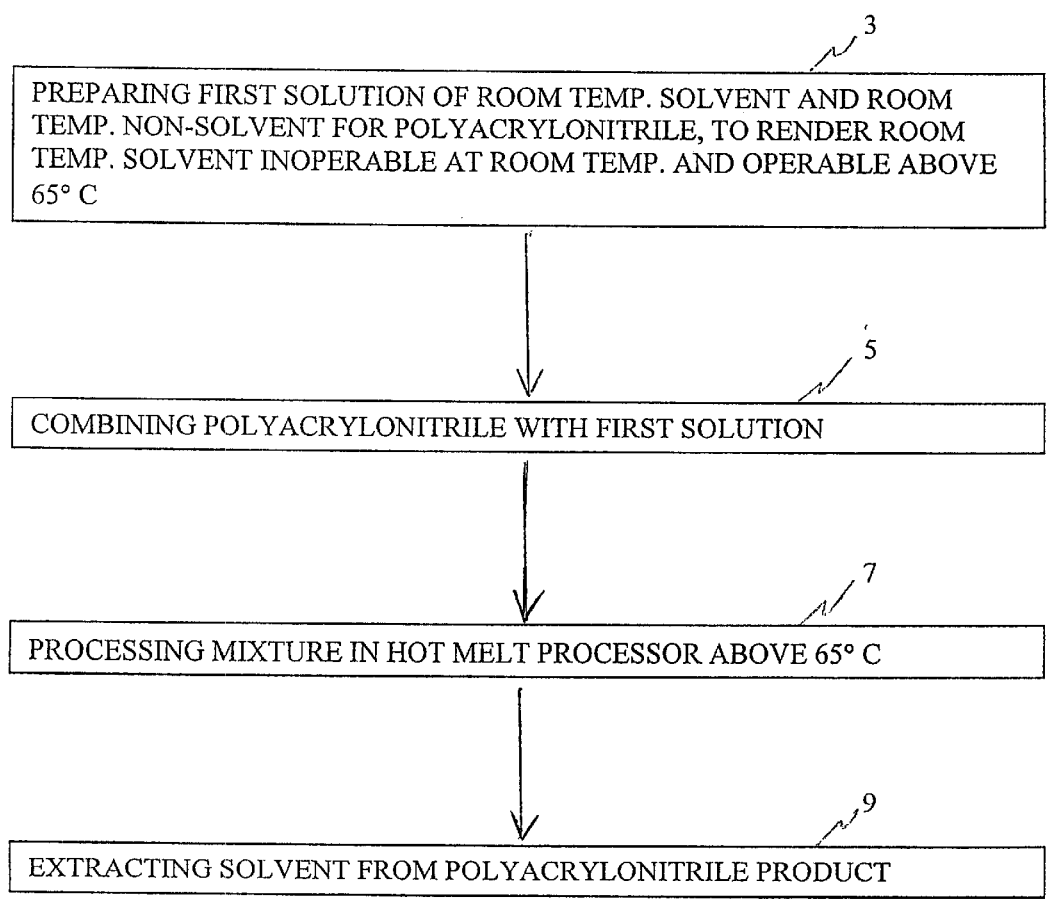
FIG. 1 shows a flow diagram of a preferred embodiment of the present invention method of processing polyacrylonitrile.

Polyacrylonitrile (PAN) is very interesting and highly versatile polymer. Its carbon-carbon backbone guaranties high biostability and resistance to degradation. PAN is produced by polymerization of acrylonitrile monomer, resulting usually in a granulated or powder form. The powder itself would have a little use in the industry, so it must subsequently be processed into another form. One of such forms is acrylic fiber, well known in apparel industry. The same acrylic fiber may be oriented and heat-treated to obtain well-known carbon fiber, a very strong and durable material.

PAN is difficult to process by conventional hot-melt processing methods, because its theoretical melting temperature is above 300° C., and its decomposition temperature is about 175° C.

PAN is usually processed by dissolving the polymer in a suitable solvent at room temperature or at elevated temperatures, to create a solution, such as in DMSO, DMF, NaSCN, Nitric Acid, $Ca(CNS)_2$, or Ethylene Carbonate. The PAN solution is then subjected to processing, such as molding or extrusion, and then remaining solvent may be extracted, e.g. in water, and subsequent water evaporation. But PAN can be processed in this way only in a low polymer concentrations, up-to about 15% because the solution viscosity is high and it is difficult to create such a solution without generating air bubbles. Trapped air bubbles will result in weakened polymeric structure and uneven composition. In addition, sometimes it is advantageous to compound filler into the PAN polymer, such as barium sulfate, metal powders or other fillers, e.g. for radio-opacity in medical application. Such fillers will further increase the solution viscosity and make processing even more difficult. The resulting dry product will also have relatively poor mechanical properties and a high rate of shrinkage due to low polymeric concentration and high solvent concentration.

For all these and other reasons, and also due to costs a waste of large amounts of solvent, it is advantageous to process PAN from higher polymeric concentrations than have been traditionally used, in a way that will yield higher quality products with superior physical characteristics.

As stated above, there is a limited number of suitable solvents for PAN, as is well known to those skilled in the art. This characteristic of PAN creates advantages and disadvantages for using PAN to formulate final products. One advantage is having an excellent resistance to most common solvents, such as hydrocarbons, ketones, alcohols and others. The countering disadvantage is that there is a limited selection of solvents for PAN processing.

By the method of the present invention, PAN can be processed by conventional hot-melt methods, such as extrusion, injection molding, compression molding and others by modifying the conventional solvent systems, so that they perform more like a melting aid, than a conventional PAN solvent system. This can be achieved by changing the conventional solvent into non-solvent for PAN at low temperatures, yet in a manner that it will be a good solvent at elevated temperatures. This process may be used for other polymeric compositions as well, but since PAN is difficult to process by conventional methods without initial co polymerization with other monomers, such as styrene or others, this novel processing method of PAN has a great advantage over conventional processing methods, which use a low polymeric concentrations. The present invention method, thereof, is described as to Polyacrylonitrile (PAN), but the terms "Polyacrylonitrile" and "PAN", as used herein is meant to include modified and unmodified Polyacrylonitrile, as well as polymer mixture containing Polyacrylonitrile.

Polymeric compositions, obtained by using the present invention method, with its novel solvent system, are very dense and strong; orientable and further processable. Various fillers can be easily compounded into PAN structure during this process, such as colorings, either reactive or pigments, radio-opacity agents, hydroxyl appatite for bone-healing promotion, or any others, which are not soluble in the solvent system, or water.

Even though all above mentioned solvents could be used, or modified for use in this invention, DMSO is preferred, because it has a relatively sharp transition point between being a poor solvent at low temperature and a good solvent at elevated temperature. DMSO is also inexpensive, has very low toxicity level and is not corrosive, compared to some other above-mentioned solvents. Its temperature range of use is high, since pure DMSO will crystallize at 18° C., and its boiling point is around 180° C.

EXAMPLES

Example 1

A solution was prepared comprising 93% of DMSO and 7% of Glycerol, by weight, to modify DMSO solvent characteristics. 53 grams of this solution was mixed with 47 grams of PAN powder, resulting in flake structure. The granular PAN absorbed or absolved or took up the solution, instead of the solution dissolving the PAN. The resulting flakes were fed into an extruder, Brabender with 1 ¼ inch screw, heated in various zones between 130 and 150° C. A mixed hopper was used for easy feeding and to prevent bridging.

The head used was for tubing extrusion, although any extruded product could be formed The resulting tubing was soft, pliable immediately after extrusion. When left on air and exposed to humidity, the tubing became harder and stronger. The tubing was then oriented (elongated) 150% in 95° C. water, and the DMSO was subsequently extracted in warm water. The tubing was dried at 60° C. for 24 hours. The resulting tubing was stiff, yet flexible, with excellent shape memory. It was transparent with a yellowish tint.

Example 2

53 grams of the solvent solution, as in Example 1, was mixed with 1.5 grams of titanium dioxide, and then mixed with 47 grams of PAN powder and 9 grams of barium sulfate. The resulting flakes were processed as in Example 1. The result was as in Example 1, but the tubing had bright white color. After the tubing was dry, it was treated with sulfuric acid mixture to introduce sulfo-groups to its surface, resulting with a highly lubricious tubing surface. This step of post-process treatment by sulfuric acid modification to create lubricious surfaces results in products that may be used in medical applications, such as surgical or drainage tubing, prosthetics, etc.

Example 3

25 grams of PAN was mixed with 75 grams of solution, comprising of 9 grams of Glycerol and 66 grams of DMSO. The result was a light paste, which was poured into a glass, cylindrical mold. The mold was immersed in boiling water for 10 minutes, let cool down to room temperature and molded article removed, DMSO extracted in water. The result was an article with very dense micro pores structure, pores filled with water. After drying and water evaporation, the article shrunk 25% linear, forming a strong, dense polymeric structure, transparent with a light yellowish tint.

Example 4

35 grams of PAN was mixed with 65 grams of solution, comprising of 3.25 grams of Glycerol, 1.95 grams of water and 59.8 grams of DMSO. Resulting heavy paste was filled into a glass mold, filling about half of its space. The other half was filled with a heavy paste, prepared the same way, but instead of PAN a hydrolyzed PAN was used. The mold was placed into boiling water for 10 minutes, then let cool-down to room temperature. The resulting article comprised of two different materials; micro pores Structure where PAN was used, and a clear, strong hydrogel where hydrolyzed PAN was used. Both structures were firmly attached to each other and could not be separated.

Example 5

50 grams of NaSCN powder was mixed with 30 grams of Methyl alcohol into a paste. This paste was mixed with 40 grams of finely ground PAN. Glass mold was filled, with open top to let the alcohol evaporate. The mold was then closed and placed in 120° C. oven for 30 minutes. After cooling down to room temperature, the article was removed from the mold and NaSCN extracted in water. The result was a micro pores structure of white color, which after drying turned to a transparent strong polymeric structure.

FIG. 1 shows a flow diagram of the general steps 3, 5, 7, and 9 of the process of the present invention.

Obviously, numerous modifications and variations of the present invention are possible in light of the above teachings. For example, a hot melt processor as used herein could be any containment with heat application, such as a heated beaker, a container in a microwave over, or any other such equivalent device that will provide container support and adequate heating. Additionally, instead of flake form product, processing could yield pellets or powder products, slurry products or any other processable form, within the scope of the present invention. It is therefore understood that within the scope of the appended claims, the invention may be practiced otherwise than as specifically described herein.

What is claimed is:

1. A method of processing polyacrylonitrile into a predetermined form, which comprises:
   (a) preparing a first solution of (i) a room temperature solvent that will dissolve polyacrylonitrile at room temperature, and, (ii) a room temperature non-solvent that will not dissolve polyacrylonitrile at room temperature, said first solution being prepared with sufficient of said non-solvent to render said room temperature solvent inoperable such that it will not dissolve polyacrylonitrile at room temperature and such that it will be operable at temperatures above 65° C. to dissolve polyacrylonitrile therein;
   (b) combining polyacrylonitrile with said first solution to form a mixture, in an amount of at least 20%, by weight, of polyacrylonitrile, based on the total weight of the mixture; and,
   (c) processing said mixture in a hot-melt processor at temperatures in excess of 65° C. to produce a polyacrylonitrile product.

2. The method of claim 1 wherein said room temperature solvent is selected from the group consisting of dimethyl sulfoxide, dimethyl formamide, NaSCN, Ca(CNS)$_2$, nitric acid, ethylene carbonate and mixtures thereof.

3. The method of claim 1 wherein said non-solvent is selected from the group consisting of water, miscible liquid carbon compounds that do not dissolve polyacrylonitrile, and combinations thereof.

4. The method of claim 3 wherein said carbon compounds are selected from the group consisting of liquid straight chain hydrocarbons, liquid ring hydrocarbons, liquid ring-straight chain hydrocarbons, and mixtures thereof.

5. The method of claim 1 wherein said non-solvent is selected from the group consisting of glycol, miscible liquid alcohols, liquid ketones, sugars and combinations thereof.

6. The method of claim 1 wherein said processing step in a hot-melt processor is a step selected from the group consisting of extrusion, injection molding, compression molding and hot casting.

7. The method of claim 1 wherein said mixture is formed in step (b) with granular polyacrylonitrile.

8. The method of claim 7 wherein mixture is a resulting mixture in flake form.

9. The method of claim 1 wherein said first solution contains about 40% to 98% of said room temperature solvent and about 60% to 2% of said room temperature non-solvent, by weight, based on the weight of said room temperature solvent and said room temperature non-solvent.

10. The method of claim 1 wherein said first solution contains at least 50%, by weight, of room temperature solvent, based on the weight of said room temperature solvent and said room temperature non-solvent.

11. A method of processing polyacrylonitrile into a predetermined form, which comprises:
   (a) preparing a first solution of (i) a room temperature solvent that will dissolve polyacrylonitrile at room temperature, and, (ii) a room temperature non-solvent that will not dissolve polyacrylonitrile at room temperature, said first solution being prepared with sufficient of said non-solvent to render said room temperature solvent inoperable such that it will not dissolve polyacrylonitrile at room temperature and such that it will be operable at temperatures above 65° C. to dissolve polyacrylonitrile therein;
   (b) combining polyacrylonitrile with said first solution to form a mixture, in an amount of at least 20%, by weight, of polyacrylonitrile, based on the total weight of the mixture;
   (c) processing said mixture in a hot-melt processor at temperatures in excess of 65° C. to produce a polyacrylonitrile product; and,
   (d) extracting said solvent from said polyacrylonitrile product by liquid extraction.

12. The method of claim 11 wherein said room temperature solvent is selected from the group consisting of dimethyl sulfoxide, dimethyl formamide, NaSCN, Ca(CNS)$_2$, nitric acid, ethylene carbonate and mixtures thereof.

13. The method of claim 11 wherein said non-solvent is selected from the group consisting of water, miscible liquid carbon compounds that do not dissolve polyacrylonitrile, and combinations thereof.

14. The method of claim 13 wherein said carbon compounds are selected from the group consisting of liquid straight chain hydrocarbons, liquid ring hydrocarbons, liquid ring-straight chain hydrocarbons, and mixtures thereof.

15. The method of claim 11 wherein said non-solvent is selected from the group consisting of glycol, miscible liquid alcohols, liquid ketones, sugars and combinations thereof.

16. The method of claim 11 wherein said processing step in a hot-melt processor is a step selected from the group consisting of extrusion, injection molding, compression molding and hot casting.

17. The method of claim 11 wherein said mixture is formed in step (b) with granular polyacrylonitrile.

18. The method of claim 17 wherein mixture is a resulting mixture in flake form.

19. The method of claim 11 wherein said first solution contains about 40% to 98% of said room temperature solvent and about 60% to 2% of said room temperature non-solvent, by weight, based on the weight of said room temperature solvent and said room temperature non-solvent.

20. The method of claim 11 wherein said first solution contains at least 50%, by weight, of room temperature solvent, based on the weight of said room temperature solvent and said room temperature non-solvent.

* * * * *